US005698323A

United States Patent [19]

Keough et al.

[11] Patent Number: 5,698,323

[45] Date of Patent: Dec. 16, 1997

[54] FLAME RETARDANT CABLE

[75] Inventors: Michael John Keough, Bridgewater; Sundaresan Ramachandran, Flemington; Geoffrey David Brown, Bridgewater, all of N.J.

[73] Assignee: Union Carbide Chemicals & Plastics Technology Corporation, Danbury, Conn.

[21] Appl. No.: 623,413

[22] Filed: Mar. 28, 1996

[51] Int. Cl.$^6$ .............................. B32B 15/00; D02G 3/00

[52] U.S. Cl. .............................. 428/379; 428/372; 428/375; 428/378; 428/920; 428/921; 174/113 R; 174/110 A; 174/110 SR; 174/110 PM

[58] Field of Search .............................. 428/372, 378, 428/375, 379, 383, 920, 921; 174/118, 121 A, 110 A, 110 SR, 110 PM

[56] References Cited

U.S. PATENT DOCUMENTS

| | | | |
|---|---|---|---|
| 4,417,018 | 11/1983 | Ogawa et al. | 524/261 |
| 4,731,406 | 3/1988 | Itoh et al. | 524/436 |
| 4,769,179 | 9/1988 | Kato et al. | 252/609 |
| 4,791,160 | 12/1988 | Kato et al. | 524/322 |
| 4,803,115 | 2/1989 | Fushiki et al. | 428/285 |
| 4,921,896 | 5/1990 | Bonin et al. | 524/403 |
| 5,158,999 | 10/1992 | Swales et al. | 524/100 |

FOREIGN PATENT DOCUMENTS

| | | |
|---|---|---|
| 332723 | 9/1989 | European Pat. Off. . |
| WO9319118 | 9/1993 | WIPO . |

*Primary Examiner*—Patrick Ryan
*Assistant Examiner*—J. M. Gray
*Attorney, Agent, or Firm*—Saul R. Bresch

[57] ABSTRACT

A cable comprising one or more electrical conductors or communications media, or a core of two or more electrical conductors or communications media, each electrical conductor, communications medium, or core being surrounded by a composition, which is essentially halogen and antimony free, comprising:

(a) a copolymer of ethylene and an unsaturated ester comonomer selected from the group consisting of:
(i) an alkyl acrylate;
(ii) an alkyl methacrylate; and
(iii) a vinyl carboxylate
wherein (A) the alkyl group has 1 to 8 carbon atoms and the carboxylate group has 2 to 8 carbon atoms;
(B) the copolymer is, optionally, modified with an anhydride of an unsaturated aliphatic diacid having 4 to 20 carbon atoms;
(C) the copolymer has an ester content in the range of about 5 to about 50 percent based on the weight of the copolymer and a melt index in the range of about 0.5 to about 50 grams per 10 minutes; and, for each 100 parts by weight of component (a), (b) about 50 to about 300 parts by weight of magnesium hydroxide, coated or uncoated, or alumina trihydrate:

(c) about 1 to about 25 parts by weight of zinc oxide; and (d) about 1 to about 15 parts by weight of red phosphorus, wherein the ratio of zinc oxide to red phosphorus is in the range of about 0.5 to about 5 parts by weight of zinc oxide per part by weight of red phosphorus.

10 Claims, No Drawings

FLAME RETARDANT CABLE

TECHNICAL FIELD

This invention relates to a flame retardant cable containing a composition comprising ethylene copolymer(s) and a hydrated inorganic flame retardant filler as insulation and/or jacketing for electrical conductors, particularly in plenum and riser cable and in shipboard and other vehicular applications, and communications media such as glass fibers in fiber optics cable.

BACKGROUND INFORMATION

A typical cable is constructed of metal conductors insulated with a polymeric material. These insulated conductors are generally twisted to form a core and are protected by another polymeric sheath or jacket material. In certain cases, added protection is afforded by inserting a wrap between the core and the sheath. In fiber optics cable, glass fibers are used instead of metal conductors, but a protective sheath is still necessary.

Plenum and riser cables are used to transmit power and data signals through ducts which are used to ventilate, for example, high-rise buildings. While a fire occurring in these ducts can be dangerous in its own right, such a conflagration is especially insidious because the smoke and other gases resulting from the fire are transported through the ducts throughout the building, even to parts quite remote from the blaze. In some cases, colorless and odorless gases can invade sleeping quarters housing unsuspecting people.

General purpose cables can be exemplified by cables useful in industrial plants and in transit applications including shipboard and underground applications. These may be referred to as tray cables. The "tray" is simply a support for one or usually several cables. It is used in cases where the cable(s) cannot be elevated as on poles or towers or buried in the ground. The tray can be in the form of a conduit having, for example, a cylindrical or box-like shape, and containing a one or more cables. Other general purpose cables find use, for example, in underground service entrance applications, and fiber optics cable is useful in telecommunications and the like.

All of these cables are generally covered with a sheath or jacket to protect them against various hazards, which are present during installation and use such as sharp and rough surfaces, extremes of heat and cold, oil, chemicals, water, and fire. Thus, it is important that the sheath be made of materials, which are not conducive to flame propagation, which is also referred to as flame spread. Flame propagation (the distance a flame spreads) is measured in inches. A commercially desirable upper limit for flame propagation would be about 45 inches as measured under Underwriters Laboratories (UL) 1685, for example. The time until burning stops, usually measured in minutes and seconds, is also a significant property, a desirable upper limit being about 7 minutes.

Depending on the particular application, flame propagation and the time until burning stops can be determined under Underwriters Laboratories (UL) 910, 1581, 1666, or 1685; Institute of Electrical and Electronics Engineers (IEEE) Standard 383; Canadian Standards Association (CSA) FT 4 or 6; or International Electrotechnical Commission (IEC) 332-3.

DISCLOSURE OF THE INVENTION

An object of this invention, therefore, is to provide a flame retardant cable, containing insulation and, particularly, jacketing in which, under conflagration conditions, flame propagation and the time until burning stops are unexpectedly reduced to optimum commercial limits. Other objects and advantages will become apparent hereinafter.

According to the present invention the above object is met by a cable comprising one or more electrical conductors or communications media, or a core of two or more electrical conductors or communications media, each electrical conductor, communications medium, or core being surrounded by a composition, which is essentially halogen and antimony free, comprising:

(a) a copolymer of ethylene and an unsaturated ester comonomer selected from the group consisting of:
   (i) an alkyl acrylate;
   (ii) an alkyl methacrylate; and
   (iii) a vinyl carboxylate
   wherein (A) the alkyl group has 1 to 8 carbon atoms and the carboxylate group has 2 to 8 carbon atoms;
   (B) the copolymer is, optionally, modified with an anhydride of an unsaturated aliphatic diacid having 4 to 20 carbon atoms;
   (C) the copolymer has an ester content in the range of about 5 to about 50 percent based on the weight of the copolymer and a melt index in the range of about 0.5 to about 50 grams per 10 minutes; and, for each 100 parts by weight of component (a), (b) about 50 to about 300 parts by weight of magnesium hydroxide, coated or uncoated, or alumina trihydrate:

(c) about 1 to about 25 parts by weight of zinc oxide; and (d) about 1 to about 15 parts by weight of red phosphorus, wherein the ratio of zinc oxide to red phosphorus is in the range of about 0.5 to about 5 parts by weight of zinc oxide per part by weight of red phosphorus.

In another embodiment of the invention in which the cable is adapted to meet the needs of various applications, the cable composition additionally contains one or more of the polymers selected from the group consisting of:

(I) about 5 to about 40 parts by weight of a very low density polyethylene having a density in the range of 0.870 to 0.915 gram per cubic centimeter and a melt index in the range of about 0.1 to about 20 grams per 10 minutes, said polyethylene being, optionally, modified with an anhydride of an unsaturated aliphatic diacid having 4 to 20 carbon atoms;

(II) about 5 to about 35 parts by weight of a polypropylene having a density in the range of 0.870 to 0.915 gram per cubic centimeter and a melt flow in the range of about 0.5 to about 20 decigrams per minute; and (III) about 5 to about 40 parts by weight of a linear low density polyethylene having a density in the range of 0.905 to 0.940 and a melt index in the range of about 1 to about 20 grams per 10 minutes, said polyethylene being, optionally, modified with an anhydride of an unsaturated aliphatic diacid having 4 to 20 carbon atoms, said parts by weight being based on 100 parts by weight of component (a).

DESCRIPTION OF THE PREFERRED EMBODIMENT(S)

Copolymers comprised of ethylene and unsaturated esters are well known, and can be prepared by conventional high pressure techniques. The unsaturated esters of interest here are the alkyl acrylates, the alkyl methacrylates, and the vinyl carboxylates. The term "copolymer" as used in this specification means a polymer derived from the polymerization of two or more monomers and, thus, includes, for example, terpolymers and tetramers. The alkyl group can have 1 to 8 carbon atoms and preferably has 1 to 4 carbon atoms. The carboxylate group can have 2 to 8 carbon atoms and preferably has 2 to 5 carbon atoms. The portion of the copolymer attributed to the ester comonomer can be in the range of about 5 to about 50 percent by weight based on the weight of the copolymer, and is preferably in the range of about 15 to about 40 percent by weight. Examples of the acrylates and methacrylates are ethyl acrylate, methyl acrylate, methyl methacrylate, t-butyl acrylate, n-butyl acrylate, n-butyl methacrylate, and 2-ethylhexyl acrylate. Examples of the vinyl carboxylates are vinyl acetate, vinyl propionate, and vinyl butanoate. The melt index of the ethylene/unsaturated ester copolymers can be in the range of about 0.5 to about 50 grams per 10 minutes, and is preferably in the range of about 2 to about 25 grams per 10 minutes. The melt index is determined in accordance with ASTM D-1238, Condition E, measured at 190° C. One process for the preparation of a copolymer of ethylene and an unsaturated ester is described in U.S. Pat. No. 3,334,081.

As noted above, the copolymer of ethylene and an unsaturated ester can be modified with an anhydride of an unsaturated aliphatic diacid. The VLDPE and the LLDPE can also be modified with such an anhydride. The modification can be accomplished in two ways. One is by grafting and the other is by copolymerization. Both techniques are conventional. The anhydrides can have 4 to 20 carbon atoms and preferably have 4 to 10 carbon atoms. Examples of anhydrides, which are useful in this invention, are maleic anhydride, itaconic anhydride, and nadic anhydride. The preferred anhydride is maleic anhydride. Excess anhydride, if present after grafting, can be removed by devolatilization at temperatures in the range of about 200° C. to about 250° C.

The grafting is accomplished by using an organic peroxide catalyst, i.e., a free radical generator, such as dicumyl peroxide; lauroyl peroxide; benzoyl peroxide; tertiary butyl perbenzoate; di(tertiary-butyl) peroxide; cumene hydroperoxide; 2,5-dimethyl-2,5-di(t-butyl-peroxy)hexyne-3; 2,5-dimethyl-2,5-di(t-butyl-peroxy)hexane; tertiary butyl hydroperoxide; isopropyl percarbonate; and alpha,alpha'-bis (tertiary-butylperoxy)diisopropylbenzene. The organic peroxide catalyst may be added together with the anhydride. Grafting temperatures can be in the range of about 100°0 to about 300° C. and are preferably in the range of abut 150° to about 200° C. A typical procedure for grafting maleic anhydride onto polyethylene is described in U.S. Pat. No. 4,506,056.

Grafting can also be accomplished by adding a solution of anhydride, an organic peroxide catalyst, and an organic solvent to polyethylene in particulate form. The organic peroxide catalyst is soluble in the organic solvent. Various organic solvents, which are inert to the reaction, can be used. Examples of useful organic solvents are acetone, methyl ethyl ketone, methyl propyl ketone, 3-pentanone, and other ketones. Other carrier solvents which allow solubilization of peroxide and anhydride, and which strip off well under appropriate devolatilization conditions may be used. Acetone is a preferred solvent because it acts as a stripping agent for residuals such as non-grafted anhydride or anhydride by-products. The anhydride solution can contain abut 10 to about 50 percent by weight anhydride; about 0.05 to about 5 percent by weight organic peroxide catalyst; and about 50 to about 90 percent by weight organic solvent based on the total weight of the solution. A preferred solution contains about 20 to about 40 percent anhydride; about 0.1 to about 2 percent peroxide; and about 60 to about 80 percent solvent.

The anhydride grafted polymer can contain about 0.05 to about 5 parts by weight of anhydride per 100 parts by weight of polymer and preferably contains about 0.1 to about 2 parts by weight of anhydride per 100 parts by weight of polymer.

As noted, anhydride modification can also be accomplished by copolymerization, for example, by the copolymerization ethylene, ethyl acrylate, and maleic anhydride. The polymerization technique is conventional, and is similar to the polymerization of the underlying comonomers for the ethylene/unsaturated ester copolymers, the VLDPE, and the LLDPE. Reference can be made to Maleic Anhydride, Trivedi et al, Plenum Press, New York, 1982, Chapter 3, section 3-2. This treatise also covers grafting.

The ethylene/unsaturated ester copolymers can be crosslinked in a conventional manner, if desired. Crosslinking is usually accomplished with an organic peroxide, examples of which are mentioned above with respect to grafting. The amount of crosslinking agent used can be in the range of about 0.5 to about 4 parts by weight of organic peroxide for each 100 parts by weight of ethylene/unsaturated ester copolymer, and is preferably in the range of about 1 to about 3 parts by weight. Crosslinking can also be effected with irradiation or moisture, or in a mold, according to known techniques. Crosslinking temperatures can be in the range of about 150 to about 250 degrees C. and are preferably in the range of about 170 to about 210 degrees C.

The copolymers can be made hydrolyzable so that they can be moisture cured. This is accomplished by grafting the copolymer with, for example, an alkenyl trialkoxy silane in the presence of an organic peroxide (examples are mentioned above), which acts as a free radical generator or catalyst. Useful alkenyl trialkoxy silanes include the vinyl trialkoxy silanes such as vinyl trimethoxy silane, vinyl triethoxy silane, and vinyl triisopropoxy silane. The alkenyl and alkoxy radicals can have 1 to 30 carbon atoms and preferably have 1 to 12 carbon atoms. The hydrolyzable polymers are moisture cured in the presence of a silanol condensation catalyst such as dibutyl tin dilaurate, dioctyl tin maleate, stannous acetate, stannous octoate, lead naphthenate, zinc octoate, iron 2-ethyl hexoate, and other metal carboxylates. The organic peroxides can be the same as those mentioned above for crosslinking.

As noted above, polymers can be advantageously added to the cable composition in order to adapt the cable for various applications. The polymers of interest are very low density polyethylene (VLDPE), polypropylene, and linear low density polyethylene (LLDPE). The VLDPE can be used, for example, where good low temperature performance is desired. The polypropylene can be used, for example, where good deformation resistance is desired. The LLDPE can be used, for example, where a combination of low temperature performance, good deformation resistance, and good processability are desired. Generally, VLDPE is advantageously used in plenum, riser, and fiber optics cables; polypropylene in all of the cables; and LLDPE in tray and fiber optics cables.

The VLDPE can be a copolymer of ethylene and one or more alpha-olefins having 3 to 12 carbon atoms and preferably 3 to 8 carbon atoms. The density of the VLDPE can be in the range of 0.870 to 0.915 gram per cubic centimeter. It can be produced, for example, in the presence of (i) a catalyst containing chromium and titanium, (ii) a catalyst containing magnesium, titanium, a halogen, and an electron donor; or (iii) a catalyst containing vanadium, an electron donor, an alkyl aluminum halide modifier, and a halocarbon promoter. Catalysts and processes for making the VLDPE are described, respectively, in U.S. Pat. Nos. 4,101,445; 4,302,565; and 4,508,842. The melt index of the VLDPE can be in the range of about 0.1 to about 20 grams per 10 minutes and is preferably in the range of about 0.3 to about 5 grams per 10 minutes. The portion of the VLDPE attributed to the comonomer(s), other than ethylene, can be in the range of about 1 to about 49 percent by weight based on the weight of the copolymer and is preferably in the range of about 15 to about 40 percent by weight. A third comonomer can be included, e.g., another alpha-olefin or a diene such as ethylidene norbornene, butadiene, 1,4-hexadiene, or a dicyclopentadiene. The third comonomer can be present in an amount of about 1 to 15 percent by weight based on the weight of the copolymer and is preferably present in an amount of about 1 to about 10 percent by weight. It is preferred that the copolymer contain two or three comonomers inclusive of ethylene.

With respect to polypropylene: homopolymers and copolymers of propylene and one or more other alpha-olefins wherein the portion of the copolymer based on propylene is at least about 60 percent by weight based on the weight of the copolymer can be used. The polypropylene can be prepared by conventional processes such as the processes described in U.S. Pat. Nos. 4,414,132 and 5,093,415. The alpha-olefins in the copolymer are preferably those having 2 or 4 to 12 carbon atoms. The density of the polypropylene can be in the range of 0.870 to about 0.915 gram per cubic centimeter, and is preferably in the range of 0.880 to 0.905 gram per cubic centimeter. The melt flow can be in the range of about 0.5 to about 20 decigrams per minute, and is preferably in the range of about 0.7 to about 10 decigrams per minute. Melt flow is determined in accordance with ASTM D-1238, Condition E, measured at 230° C., and is reported in decigrams per minute. Impact polypropylenes can also be used, if desired. See, for example, U.S. Pat. No. 4,882,380.

The LLDPE can be a copolymer of ethylene and one or more alpha-olefins having 3 to 12 carbon atoms, and preferably 3 to 8 carbon atoms. The density can be in the range of 0.905 to 0.940 gram per cubic centimeter. The melt index can be in the range of about 1 to about 20 grams per 10 minutes, and is preferably in the range of about 3 to about 8 grams per 10 minutes. The alpha-olefins can be the same as those used in VLDPE, and the catalysts and processes are also the same subject to variations necessary to obtain the desired densities and melt indices.

The VLDPE, the polypropylene, and the LLDPE can be crosslinked and made hydrolyzable, if desired, using the same techniques described above for the ethylene/unsaturated ester copolymer.

As hydrated inorganic flame retardant fillers, magnesium hydroxide (preferred) or alumina trihydrate are used. While conventional off-the-shelf magnesium hydroxide and alumina trihydrate can be used, a preferred magnesium hydroxide has the following characteristics: (a) a strain in the <101> direction of no more than $3.0\times10^{-3}$; (b) a crystallite size in the <101> direction of more than 800 angstroms; and (c) a surface area, determined by the BET method, of less than 20 square meters per gram. The preferred magnesium hydroxide and a method for its preparation are disclosed in U.S. Pat. No. 4,098,762. A preferred characteristic of this magnesium hydroxide is that the surface area, as determined by the BET method, is less than 10 square meters per gram.

The amount of hydrated filler used in the composition can be in the range of about 50 to about 300 parts by weight of hydrated filler per 100 parts by weight of component (a), i.e., the ethylene/unsaturated ester copolymer(s), and is preferably present in the range of about 100 to about 250 parts by weight of hydrated filler per 100 parts by weight of the copolymer(s), about 150 to about 200 parts being the optimum.

The hydrated filler can be surface treated (coated) with a saturated or unsaturated carboxylic acid having about 8 to about 24 carbon atoms and preferably about 12 to about 18 carbon atoms or a metal salt thereof, but coating is optional. Mixtures of these acids and/or salts can be used, if desired. Examples of suitable carboxylic acids are oleic, stearic, palmitic, isostearic, and lauric; of metals which can be used to form the salts of these adds are zinc, aluminum, calcium, magnesium, and barium; and of the salts themselves are magnesium stearate, zinc oleate, calcium palmitate, magnesium oleate, and aluminum stearate. The amount of acid or salt can be in the range of about 0.1 to about 5 parts of acid and/or salt per one hundred parts of metal hydrate and is preferably about 0.25 to about 3 parts per one hundred parts of metal hydrate. The surface treatment is described in U.S. Pat. No. 4,255,303. The acid or salt can be merely added to the composition in like amounts rather than using the surface treatment procedure, but this is not preferred.

Zinc oxide and red phosphorus can be used in a ratio of about 0.5 to about 5 parts by weight zinc oxide per part by weight of red phosphorus, and are preferably used in a weight ratio of about 0.5 to about 2.5 parts by weight zinc oxide per part by weight of red phosphorus. Both are conventional off-the-shelf materials. The zinc oxide is present in the composition in an amount of 1 to about 25 parts by weight for each 100 parts by weight of the ethylene/unsaturated ester copolymer, and is preferably present in an amount of 3 to about 15 parts by weight for each 100 parts by weight of the ethylene/unsaturated ester copolymer. The red phosphorus is present in the composition in an amount of 1 to about 15 parts by weight for each 100 parts by weight of the ethylene/unsaturated ester copolymer, and is preferably present in an amount of 2 to about 10 parts by weight for each 100 parts by weight of the ethylene/unsaturated ester copolymer. The zinc oxide is generally introduced into the composition used in the cable of the invention as is; however, the red phosphorus is typically mixed with one of the polymers used in the composition in a weight ratio of 1:1, and then added to the composition.

Conventional additives, which can be introduced into the thermoplastic resin formulation, are exemplified by antioxidants, ultraviolet absorbers or stabilizers, antistatic agents, pigments, dyes, nucleating agents, reinforcing fillers or polymer additives, slip agents, plasticizers, processing aids, lubricants, viscosity control agents, tackifiers, anti-blocking agents, surfactants, extender oils, metal deactivators, water tree growth retardants, voltage stabilizers, additional flame retardant additives, and smoke suppressants. Additives can be added in amounts ranging from less than about 0.1 to about 10 parts by weight for each 100 parts by weight of the base resin, in this case, the ethylene/unsaturated ester copolymer except for carbon black and fillers. Carbon black is often added in amounts up to 15 parts by weight. Fillers, other than the magnesium hydroxide or alumina trihydrate, can be added in amounts ranging from about 1 to about 50 parts by weight.

Examples of antioxidants are: hindered phenols such as tetrakis[methylene (3,5-di-tert-butyl-4-hydroxyhydrocinnamate)]methane; thiodiethylene bis(3,5-di-tert-butyl-4-hydroxy)hydrocinnamate; 1,2-bis(3,5-di-tert-butyl-4-hydroxy hydrocinnamoyl) hydrazine; and distearyl thio dipropionate; phosphites and phosphonites such as tris(2,4-di-tert-butylphenyl) phosphite and di-tert-butylphenylphosphonite; various amines such as polymerized 2,2,4-trimethyl-1,2-dihydroquinoline; and silica. Antioxidants are used in amounts of about 1 to about 5 parts by weight per 100 parts by weight of ethylene/unsaturated ester copolymer(s).

The advantages of the flame retardant cable of the invention are that it meets the flame propagation and "time until burning stops" tests required for commercial utilization at an optimal level, an unexpected result. In addition, the cable composition is easily processed in an extruder; lower levels of hydrated mineral filler can be used; and the low smoke requirement is met.

Patents and other publications mentioned in this specification are incorporated by reference herein.

The invention is illustrated by the following examples.

EXAMPLES 1 to 7

Resins and other components used in the examples are as follows:

EEA=an ethylene/ethyl acrylate copolymer having a melt index of 1.6 grams per 10 minutes and an ethyl acrylate content of 16 percent by weight based on the weight of the copolymer.

EVA=an ethylene/vinyl acetate copolymer having a melt index of 3 grams per 10 minutes and an vinyl acetate content of 40 percent by weight based on the weight of the copolymer.

VLDPE=a very low density polyethylene having a melt index of 0.4 grams per 10 minutes and a density of 0.900 gram per cubic centimeter.

LLDPE=a linear low density polyethylene having a melt index of 3.4 grams per 10 minutes and a density of 0.910 gram per cubic centimeter grafted with 0.3 percent by weight maleic anhydride based on the weight of the LLDPE.

PP=polypropylene having a melt flow of 0.8 decigrams minute and a density of 0.890 gram per cubic centimeter.

$Mg(OH)_2$ (I)=a zinc stearate coated magnesium hydroxide having the characteristics of the preferred magnesium hydroxide described above.

$Mg(OH)_2$ (II)=an uncoated conventional magnesium hydroxide.

Red Phosphorus=a 50 percent by weight mixture of red phosphorus in high pressure low density polyethylene.

Carbon Black=a carbon black/polyethylene masterbatch in which the carbon black is present in an amount of 35 percent by weight based on the weight of the masterbatch.

A/O I=a primary antioxidant, tetrakis[methylene (3,5-di-tert-butyl-4-hydroxyhydrocinnamate)]-methane.

A/O II=a secondary antioxidant, 1,2-bis(3,5-di-tert-butyl-4-hydroxy hydrocinnamoyl) hydrazine.

A/O III=distearyl thio dipropionate.

Variables and results are set forth in the following Tables. The objective is to provide a cable that passes the flame test with a High Pass:

TABLE I

| Cable Components | Examples 1 | 2 | 3 | 4 | 5 | 6 | 7 |
|---|---|---|---|---|---|---|---|
| | parts by weight | | | | | | |
| EEA | 100.00 | 100.00 | 100.00 | 100.00 | 100.00 | 100.00 | — |
| EVA | — | — | — | — | — | — | 100.00 |
| VLDPE | 27.06 | — | | 27.11 | 27.06 | — | — |
| LLDPE | — | — | — | — | — | — | 32.7 |
| PP | — | 27.06 | 26.87 | — | — | 27.06 | — |
| $Mg(OH)_2$(I) | 148.53 | 148.53 | — | 150.60 | 141.18 | 141.18 | 244.1 |
| $Mg(OH)_2$(II) | — | — | 141.79 | — | — | — | — |
| talc | — | — | — | — | — | — | 6.1 |
| zinc stearate | — | — | 3.57 | 0.15 | — | — | — |
| red phosphorous | 7.35 | 7.35 | 7.46 | 7.53 | 7.35 | 7.35 | 10.2 |
| zinc oxide | — | — | 7.46 | — | 7.35 | 7.35 | 10.2 |
| carbon black | 9.56 | 9.56 | 9.70 | 9.79 | 9.56 | 9.56 | 4.1 |
| A/O I | 0.59 | 0.59 | 0.59 | 0.60 | 0.59 | 0.59 | 0.82 |
| A/O II | 0.59 | 0.59 | 0.59 | 0.60 | 0.59 | 0.59 | — |
| A/O III | 0.44 | 0.44 | 0.45 | 0.45 | 0.44 | 0.44 | — |

TABLE II

| Vertical Cable Tray Flame Test (UL-1685) | | | | | | | |
|---|---|---|---|---|---|---|---|
| Example | 1 | 2 | 3 | 4 | 5 | 6 | 7 |
| Time Until Burning Stops (minutes/seconds) | 8'45" | 10'15" | 4'30" | 8'30" | 6'15" | 6'15" | 6'35" |
| Length of Propagation (inches) | 85 | 92 | 37 | 96 | 34 | 34 | 42 |
| Pass/Fail | Low Pass | Low Pass | High Pass | Fail | High Pass | High Pass | High Pass |

Notes to Table:

1. UL-1685 is the vertical flame test for tray cables. It is carried out on 14 AWG (American Wire Gauge) copper wires, each of which is coated with one of the above formulations. The thickness of the coating is 45 mils.

2. High Pass=Passes test with relatively low time until burning stops and low length of propagation.

3. Low Pass=Passes test with relatively high time until burning stops and high length of propagation.

We claim:

1. A cable comprising one or more electrical conductors or communications media, or a core of two or more electrical conductors or communications media, each electrical conductor, communications medium, or core being surrounded by an extrudable composition, which is essentially halogen and antimony free, consisting essentially of:

(a) a copolymer of ethylene and an unsaturated ester comonomer selected from the group consisting of:
 (i) an alkyl acrylate;
 (ii) an alkyl methacrylate; and
 (iii) a vinyl carboxylate
 wherein (A) the alkyl group has 1 to 8 carbon atoms and the carboxylate group has 2 to 8 carbon atoms;
 (B) the copolymer is, optionally, modified with an anhydride of an unsaturated aliphatic diacid having 4 to 20 carbon atoms;
 (C) the copolymer has an ester content in the range of about 5 to about 50 percent based on the weight of the copolymer and a melt index in the range of about 0.5 to about 50 grams per 10 minutes; and, for each 100 parts by weight of component (a), (b) about 50 to about 300 parts by weight of magnesium hydroxide, coated or uncoated, or alumina trihydrate:

(c) about 1 to about 25 parts by weight of zinc oxide; and (d) about 1 to about 15 parts by weight of red phosphorus, wherein the ratio of zinc oxide to red phosphorus is in the range of about 0.5 to about 5 parts by weight of zinc oxide per part by weight of red phosphorus.

2. The cable defined in claim 1 wherein the composition additionally contains one or more of the polymers selected from the group consisting of:

(I) about 5 to about 40 parts by weight of a very low density polyethylene having a density in the range of 0.870 to 0.915 gram per cubic centimeter and a melt index in the range of about 0.1 to about 20 grams per 10 minutes, said polyethylene being, optionally, modified with an anhydride of an unsaturated aliphatic diacid having 4 to 20 carbon atoms;

(II) about 5 to about 35 parts by weight of a polypropylene having a density in the range of 0.870 to 0.915 gram per cubic centimeter and a melt flow in the range of about 0.5 to about 20 decigrams per minute; and (III) about 5 to about 40 parts by weight of a linear low density polyethylene having a density in the range of 0.905 to 0.940 and a melt index in the range of about 1 to about 20 grams per 10 minutes, said polyethylene being, optionally, modified with an anhydride of an unsaturated aliphatic diacid having 4 to 20 carbon atoms, said parts by weight being based on 100 parts by weight of component (a).

3. The cable defined in claim 2 wherein the copolymer, the very low density polyethylene, and the linear low density polyethylene are modified with the anhydride in an amount of about 0.05 to about 5 percent by weight anhydride based on the weight of the polymer.

4. The cable defined in claim 2 wherein the cable composition contains about 3 to about 15 parts by weight of zinc oxide; about 2 to about 10 parts by weight of red phosphorus; and the ratio of zinc oxide to red phosphorus is in the range of about 0.5 to about 2.5 parts by weight of zinc oxide per part by weight of red phosphorus.

5. The cable defined in claim 1 wherein the alkyl group has 1 to 4 carbon atoms; the carboxylate group has 2 to 5 carbon atoms; and the anhydride has 4 to 10 carbon atoms.

6. The cable defined in claim 1 wherein the copolymer has an ester content in the range of about 15 to about 40 percent by weight and a melt index in the range of about 2 to about 25 grams per 10 minutes.

7. A cable comprising one or more electrical conductors or communications media, or a core of two or more electrical conductors or communications media, each electrical conductor, communications medium, or core being surrounded by an extrudable composition, which is essentially halogen and antimony free, consisting essentially of:

(a) a copolymer of ethylene and an unsaturated ester comonomer selected from the group consisting of:
 (i) an alkyl acrylate;
 (ii) an alkyl methacrylate; and
 (iii) a vinyl carboxylate
 wherein (A) the alkyl group has 1 to 4 carbon atoms and the carboxylate group has 2 to 5 carbon atoms;
 (B) the copolymer is, optionally, modified with an anhydride of an unsaturated aliphatic diacid having 4 to 10 carbon atoms;
 (C) the copolymer has an ester content in the range of about 15 to about 40 percent based on the weight of the copolymer and a melt index in the range of about 2 to about 25 grams per 10 minutes; and, for each 100 parts by weight of component (a), (b) about 100 to about 250 parts by weight of magnesium hydroxide, coated or uncoated, or alumina trihydrate:

(c) about 3 to about 15 parts by weight of zinc oxide; and (d) about 2 to about 10 parts by weight of red phosphorus, wherein the ratio of zinc oxide to red phosphorus is in the range of about 0.5 to about 2.5 parts by weight of zinc oxide per part by weight of red phosphorus, and wherein the composition additionally contains one or more of the polymers selected from the group consisting of:

(I) about 5 to about 40 parts by weight of a very low density polyethylene having a density in the range of 0.870 to 0.915 gram per cubic centimeter and a melt index in the range of about 0.1 to about 20 grams per 10 minutes, said polyethylene being, optionally, modified with an anhydride of an unsaturated aliphatic diacid having 4 to 10 carbon atoms;

(II) about 5 to about 35 parts by weight of a polypropylene having a density in the range of 0.870 to 0.915 gram per cubic centimeter and a melt flow in the range of about 0.5 to about 20 decigrams per minute; and (III) about 5 to about 40 parts by weight of a linear low density polyethylene having a density in the range of 0.905 to 0.940 and a melt index in the range of about 1 to about 20 grams per 10 minutes, said polyethylene being, optionally, modified with an anhydride of an unsaturated aliphatic diacid having 4 to 10 carbon atoms, said parts by weight being based on 100 parts by weight of component (a).

8. The cable defined in claim 7 wherein the copolymer, the very low density polyethylene, and the linear low density polyethylene are modified with the anhydride in an amount of about 0.1 to about 2 percent by weight anhydride based on the weight of the polymer.

9. The cable defined in claim 8 wherein the anhydride is maleic anhydride.

10. The cable defined in claim 9 wherein the unsaturated ester comonomer is either ethyl acrylate or vinyl acetate.

* * * * *